(12) United States Patent
Huynh

(10) Patent No.: US 8,832,366 B1
(45) Date of Patent: Sep. 9, 2014

(54) DISK DRIVE TO COALESCE UNALIGNED WRITES IN WRITE OPERATIONS

(75) Inventor: Sang Huynh, Yorba Linda, CA (US)

(73) Assignee: Western Digital Technologies, Inc., Irvine, CA (US)

(*) Notice: Subject to any disclaimer, the term of this patent is extended or adjusted under 35 U.S.C. 154(b) by 109 days.

(21) Appl. No.: 12/968,587

(22) Filed: Dec. 15, 2010

(51) Int. Cl.
  *G06F 12/00* (2006.01)
(52) U.S. Cl.
  USPC ............................ 711/113; 711/167; 711/171
(58) Field of Classification Search
  USPC .......................................................... 711/113
  See application file for complete search history.

(56) References Cited

U.S. PATENT DOCUMENTS

| | | | | |
|---|---|---|---|---|
| 5,050,169 | A | * | 9/1991 | Monett .......................... 714/719 |
| 5,890,211 | A | * | 3/1999 | Sokolov et al. ................ 711/113 |
| 5,970,508 | A | * | 10/1999 | Howe et al. .................... 711/113 |
| 6,092,149 | A | * | 7/2000 | Hicken et al. ................. 711/113 |
| 6,397,294 | B2 | * | 5/2002 | Kamo et al. ................... 711/114 |
| 6,925,526 | B2 | | 8/2005 | Hall |
| 7,376,784 | B2 | | 5/2008 | Espeseth et al. |
| 7,574,558 | B2 | | 8/2009 | Morley et al. |
| 2009/0150614 | A1 | * | 6/2009 | Auerbach et al. ............. 711/118 |
| 2009/0168230 | A1 | * | 7/2009 | Hwang et al. .............. 360/77.08 |
| 2011/0026159 | A1 | * | 2/2011 | Tsai et al. ......................... 360/75 |

OTHER PUBLICATIONS

Brain, Marshal; "How Hard Disks Work"; retrieved from http://computer.howstuffworks.com/hard-disk7.htm on Aug. 6, 2013; Copyright 2000.*

* cited by examiner

*Primary Examiner* — April Y Blair
*Assistant Examiner* — Prasith Thammavong

(57) ABSTRACT

A disk drive to implement write operations requested by a host is disclosed. The disk drive comprises: a disk having a plurality of tracks, wherein each track includes a plurality of physical data sectors; a head actuated over the disk; and control circuitry. The control circuitry is operable to determine if a write request from the host includes logic data that includes unaligned writes, and if so: coalesces nearby writes; performs a group read operation to create a plurality of groups; and performs a write operation to write the logic data to the physical data sectors based upon the plurality of groups, wherein the physical data sectors are written to the disk during a single revolution of the disk.

19 Claims, 4 Drawing Sheets

DISK DRIVE TO COALESCE UNALIGNED WRITES IN WRITE OPERATIONS

BACKGROUND

Today, computing devices such as personal computers, laptop computers, personal digital assistants, cell-phones, etc., are routinely used at work, home, and everywhere in-between. Computing devices advantageously enable the use of application specific software, file sharing, the creation of electronic documents, and electronic communication and commerce through the Internet and other computer networks. Typically, each computing device has a storage peripheral such as a disk drive.

A huge market exists for disk drives for mass-market computing devices such as desktop computers, laptop computers, as well as small form factor (SFF) disk drives for use in mobile computing devices (e.g., personal digital assistants (PDAs), cell-phones, digital cameras, etc.). To be competitive, a disk drive should be relatively inexpensive and provide substantial capacity, rapid access to data, and reliable performance.

Disk drives typically comprise a disk and a head connected to a distal end of an actuator arm which is rotated by a pivot by a voice coil motor (VCM) to position the head radially over the disk. The disk typically comprises a plurality of radially spaced, concentric tracks for recording user data sectors and servo sectors. The servo sectors typically comprise head positioning information (e.g., a track address) which is read by the head and processed by a servo control system to control the velocity of the actuator arm as it seeks from track to track.

Data is typically written to the disk by modulating a write current in an inductive coil of the head to record magnetic transitions onto the disk surface. During readback, the magnetic transitions are sensed by a read element (e.g., a magnetoresistive element) of the head and the resulting read signal is demodulated by a suitable read channel.

Also, a cache memory may temporarily store data to be written to the disk based upon write commands from the host computer. The cache memory is periodically flushed to write the data to the disk. However, when writing data to the disk, there may be an inherent performance degradation when dealing with unaligned writes on a disparate sector disk drive. This is because the data designated for writing may not completely fill a physical data sector of disk such that the missing data must be read from the disk before the physical data sector can be written to with the partial write data. This is sometimes referred to as a Read Modify Write (RMW). Unfortunately, because of the many unaligned writes that are necessary when flushing the cache, many RMW operations are required, resulting in an excessive amount of processing functions and time to implement all of the RMW operations.

DETAILED DESCRIPTION

Figure 1:
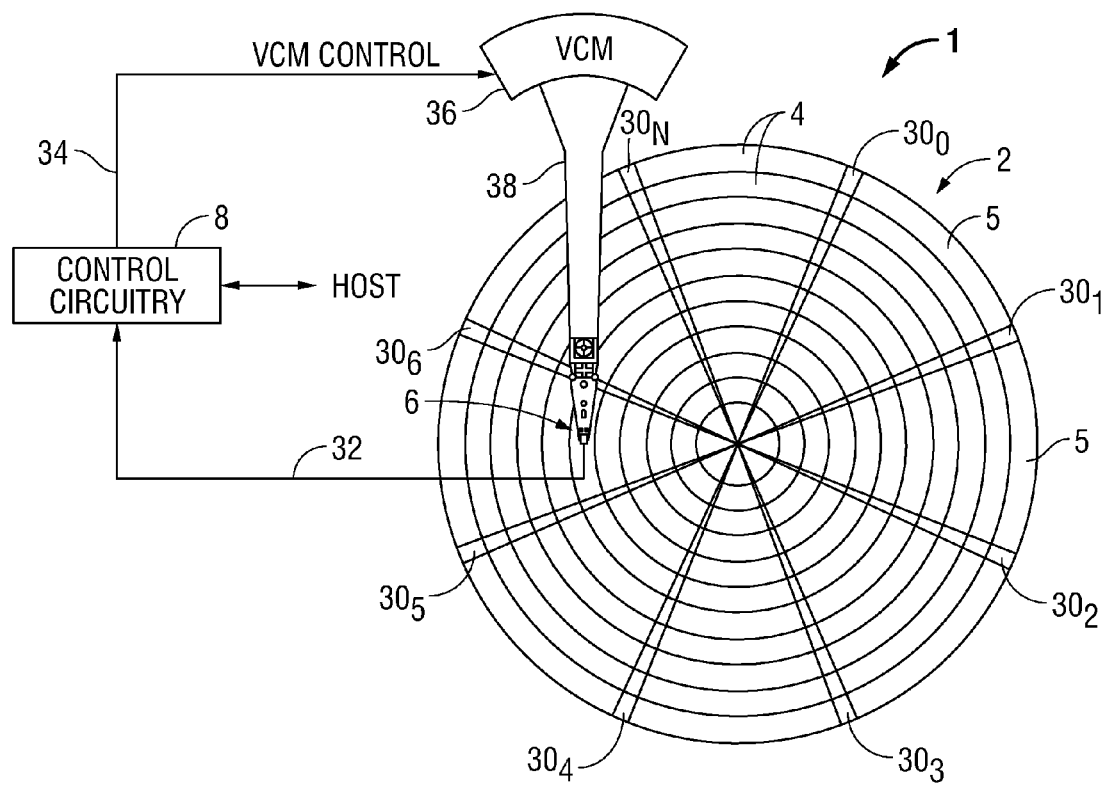
FIG. 1 shows a disk drive according to one embodiment of the invention.

FIG. 1 shows a disk drive 1 according to one embodiment of the invention comprising a disk 2 having a plurality of tracks 4 and a head 6 actuated over the disk 2. In one embodiment, disk 2 comprises a plurality of embedded servo sectors $30_0$-$30_N$ which define the plurality of tracks 4. Each servo sector $30_i$ comprises head positioning information such as a track address for course positioning during seeks and servo bursts for fine positioning while tracking the centerline of a target track during write/read operations. Further, each of the tracks 4 includes physical data sectors 5 between each of the servo sectors $30_i$. The control circuitry 8 processes a read signal 32 emanating from the head 6 to demodulate the servo sectors into a position error signal (PES). The PES is filtered with a suitable compensation filter to generate a control signal 34 applied to a voice coil motor (VCM) 36 which rotates an actuator arm 38 of an actuator assembly about a pivot in a direction that reduces the PES.

Figure 2:
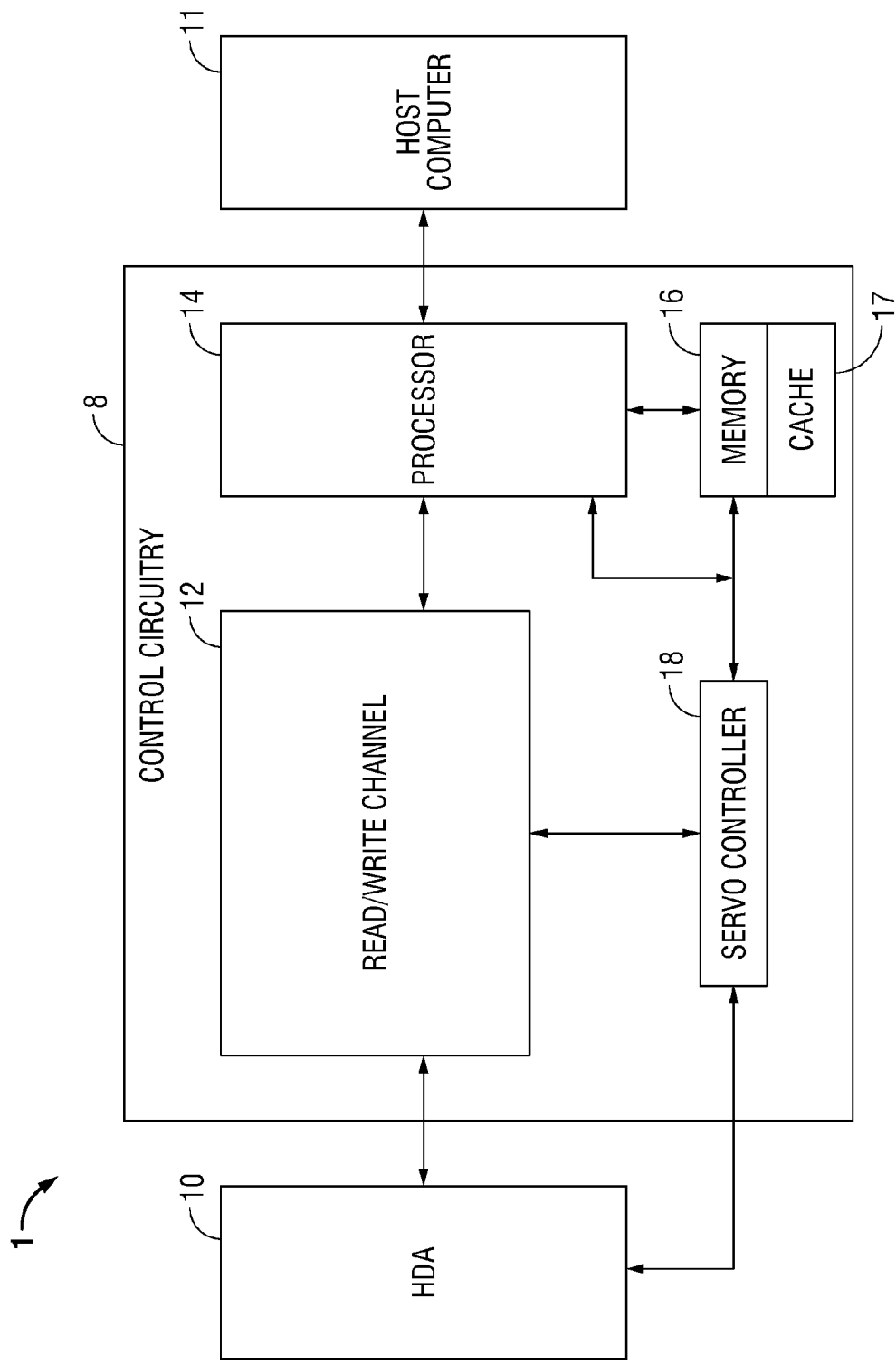
FIG. 2 shows a simplified block diagram of components of a disk drive in which embodiments of the invention may be practiced.

With reference also to FIG. 2, FIG. 2 shows a simplified block diagram of components of disk drive 1 in which embodiments of the invention may be practiced. Disk drive 1 may comprise a Head Disk Assembly (HDA) 10 and control circuitry 8 that may be implemented in a printed circuit board assembly (PCBA). Control circuitry 8 may be coupled to a host computer 11 such as a desktop computer, a laptop computer, a mobile computing device (e.g., PDA, camera, cell-phone, etc.), or any type of computing device.

HDA 10 may comprise one or more disk(s) 2, a spindle motor for rapidly spinning each disk 2 on a spindle, and an actuator assembly including a VCM 36 and an actuator arm 38 for moving one or more head(s) 6 in unison over disk(s) 2, as previously described. Further, as previously described, disk(s) 2 may be formatted with servo sectors 30, and physical data sectors 5. Control circuitry 8 may comprise a read/write channel 12, a processor 14, a memory 16, and a servo controller 18.

Host initiated operations for reading and writing data for disk drive 1 may be executed under the control of processor 14 connected to the read/write channel 12, servo controller 18, and memory arrays 16. For example, program code executed by processor 14 may be stored in non-volatile memory and random access memory (RAM) 16. Program overlay code stored on reserved tracks 4 of disk 2 may also be loaded into memory 16 as required for execution. Further, memory 16 may include cache memory 17.

During disk read and write operations, data transferred by HDA 10 may be encoded and decoded by read/write channel 12. For example, during read operations, read/write channel 12 may decode data into digital bits for use by processor 14. During write operations, processor 14 may provide digital data to read/write channel 12 which encodes the data prior to its transmittal to HDA 10. Further, processor 14 may operate as a disk controller for formatting and providing error detection and correction of disk data, a host interface controller for responding to commands from host 11, and a buffer controller for storing data which is transferred between disk(s) 2 and host 11. Also, servo controller 18 provides an interface between processor 14 and HDA 10. Processor 14 may command logic in servo controller 18 to position actuator arm 38 and head 6 using VCM driver 36 and to precisely control the rotation of a spindle motor to spin the disk(s) 2.

Disk drive 1 may employ a sampled servo system in which equally spaced servo sectors 30, are recorded on each track 4 of each disk 2. Physical data sectors 5 are recorded in the intervals between the servo sectors on each track. Servo sectors 30, may be sampled at regular intervals by servo controller 18 to provide servo position information to processor 14. Servo sectors 30, may be received by read/write channel 12 and are processed by servo controller 18 to provide position information to processor 14. It should be appreciated that this is a simplified description of a disk drive and that many different types of disk drive implementations may be implemented in accordance with embodiments of the invention. For example, there may be a large amount of physical data sectors 5 between servo sectors $30_i$.

Disk drive 1 may implement write operations to write data to the physical data sectors 5 of the disk 2. In one embodiment, disk drive 1 may coalesce unaligned writes during the write operations. In particular, control circuitry 8 may be operable to determine if a write request from the host computer 11, stored in cache memory 17, includes logic data that includes unaligned writes to the physical data sectors 5 of the disk 2, and if so, the control circuitry: coalesces nearby writes; performs a group operation to create a plurality of groups; and performs a write operation to write the logic data to the physical data sectors 5 based upon the plurality of groups, wherein the physical data sector 5 are written to the disk during one single revolution of the disk.

By utilizing this process, embodiments of the invention reduce the performance degradation suffered when handling unaligned writes by reducing the amount of RMW operations.

In one embodiment, the coalesced unaligned writes are on the same track 4 of the disk 2. Further, as will be described, the groups of the plurality of groups may be adjacent to one another or not adjacent to one another.

Figure 3:
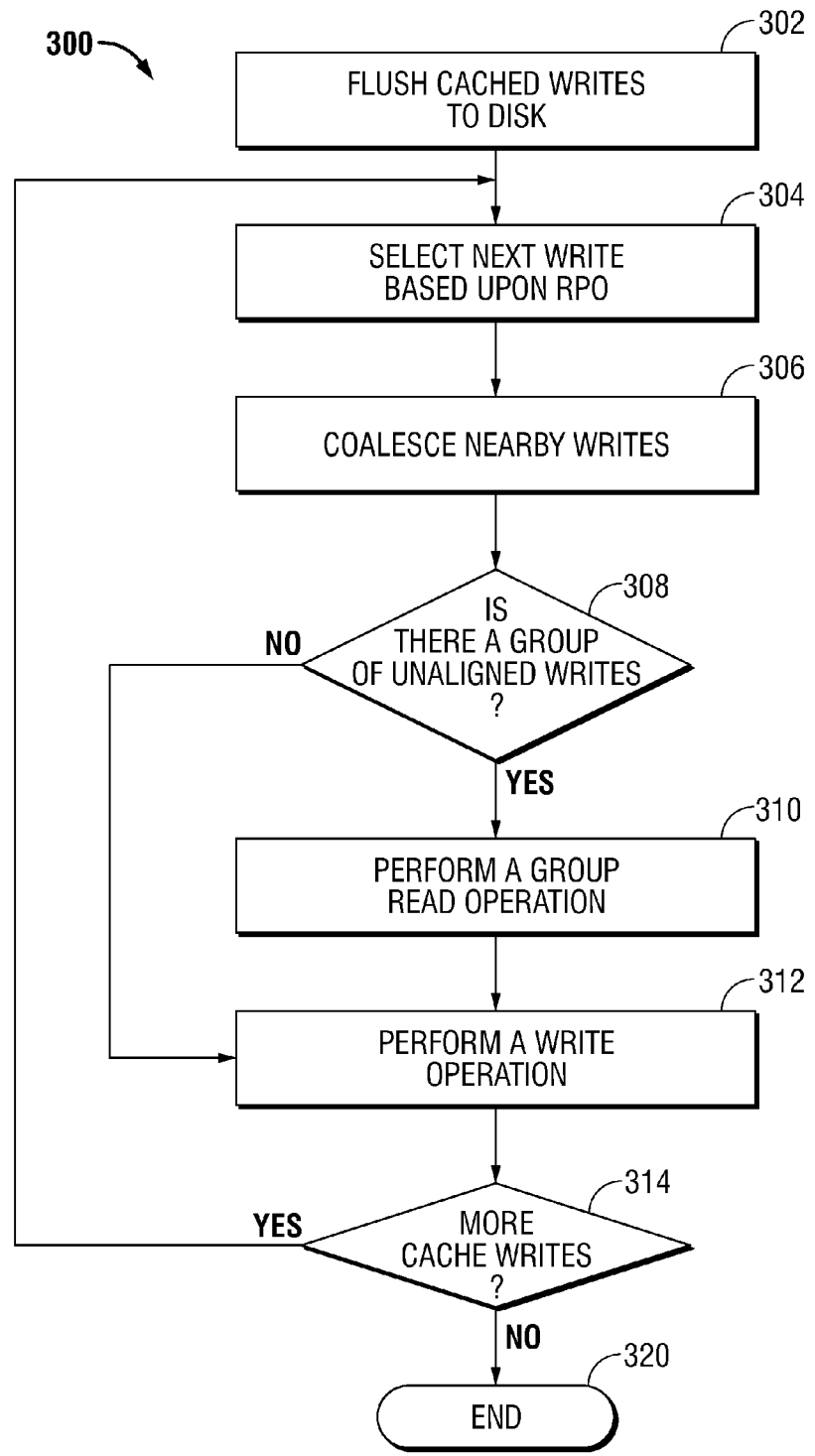
FIG. 3 is a flow diagram illustrating a process to coalesce unaligned writes during write operations, according to one embodiment of the invention.

With reference also to FIG. 3, FIG. 3 is a flow diagram illustrating a process 300 to coalesce unaligned writes during write operations, according to one embodiment of the invention. As set forth in process 300, cache writes are flushed to disk 2 from cache memory 17 (block 302). Based upon a rotational positional optimization (RPO) protocol of the disk drive 1, a next write is selected (block 304). Nearby writes are coalesced (block 306).

At decision block 308, process 300 determines whether there is a group of unaligned writes. If not, then a write operation is simply performed (block 312). However, if there is a group of unaligned writes, a group read operation is performed to create a plurality of groups (block 310). Next, a write operation is performed to write the logic data to the physical data sectors 5 of the disk 2 based upon the plurality of groups (block 312). For example, the physical data sectors 5 may be written to the disk 2 during a single revolution of the disk. At decision block 314, process 300 determines whether more cache writes are needed, if so process 300, returns to block 304, and if not, process 300 ends.

Figure 4:
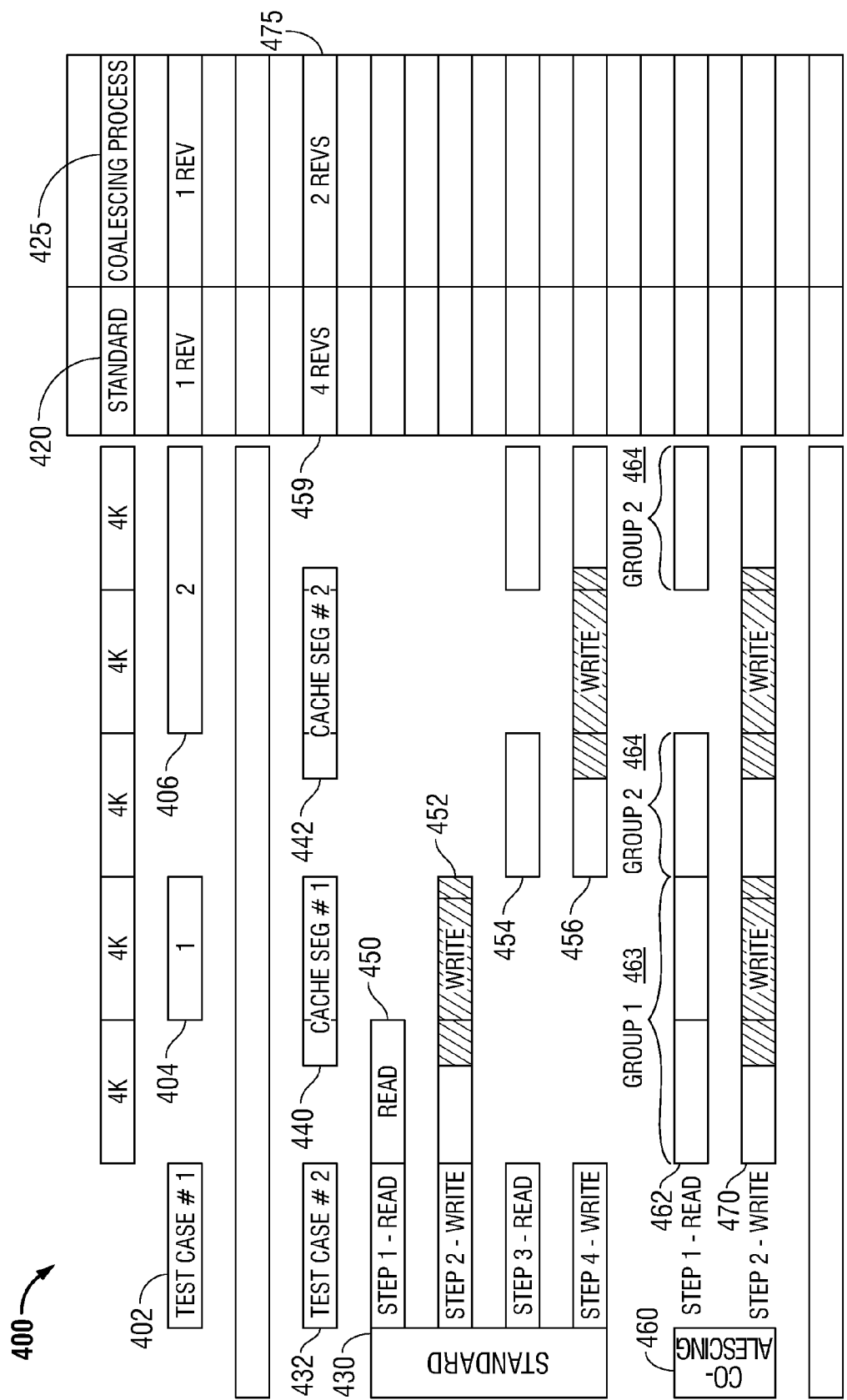
FIG. 4 is a table illustrating a methodology to coalesce unaligned writes during write operations in an efficient manner, according to one embodiment of the invention.

With reference also to FIG. 4, FIG. 4 is a table 400 illustrating a methodology to coalesce unaligned writes during write operations in an efficient manner, according to one embodiment of the invention. In particular, as has been previously described, and will be described in more detail hereinafter, control circuitry 8 may be operable to determine if a write command from the host computer 11, stored in cache memory 17, includes logic data that includes unaligned writes to the physical data sectors 5 of the disk 2, and if so, the control circuitry: coalesces nearby writes; performs a group operation to create a plurality of groups; and performs a write operation to write the logic data to the physical data sectors 5 of the disk 2 based upon the plurality of groups, wherein the physical data sector 5 are written to the disk during one single revolution of the disk. Thus, when the cache memory 17 is flushed, logic data from the cache is written the physical data sectors of the disk.

As shown in FIG. 4, looking at an initial test case #1 402, if cache logic data segments 404 and 406 are of equal size to the size of the physical data sectors of the disk (e.g. 4K) then these logic data segments 404 and 406 can be directly written to the physical data sectors of the disk in one revolution of the disk. This holds true for standard read modify write (RMW) operations 420 or the coalescing process 425, according to embodiments of the invention.

To illustrate the effectiveness of the embodiments of invention related to coalescing unaligned writes during write operations, the standard RMW procedure 430 will first be looked at. As to test case number #2 432, a first cache logic data segment #1 440 and a second cache logic data segment #2 442 need to be written from the cache to the disk. Because cache logic data segment #1 440 is larger than the physical data sector of the disk it will need to be spread across two physical data sectors of the disk. Therefore, a step #1 read operation 450 is first performed to read from the physical data sector of the disk and then a step #2 write operation 452 is performed to write the cache logic data segment #1 440 across two physical data sectors of the disk. Next, because a second cache logic data segment #2 442 needs to be written to the disk, which is larger than a physical data sector of the disk, a step #3 read operation 454 needs to be performed to read two physical data sectors of the disk and then a step #4 write operation 456 needs to be preformed to write the second cache logic data segment #2 442 to the disk across three physical data sectors. Accordingly, by utilizing standard RMW operations, four disk drive revolutions 459 are required to implement cache writing to the disk.

According to embodiments of the invention, unaligned writes may be coalesced during write operations. For example, as shown FIG. 4, the unaligned writes of both cache logic data segments #1 and #2 440 and 442 are identified and may be coalesced with one another as part of coalescing process 460. First, a group read operation 462 is performed to create a plurality of groups: group 1 463 and group 2 464 in which the physical data sectors of the disk are read. It should be noted that for a cache logical data segment of equal size to a physical data sector (e.g. 4K), a read operation does not need to be performed. Next, a write operation 470 is performed to write the logic data of cache logic data segments #1 and #2 440 and 442 to physical data sectors of the disk, based upon the plurality of groups, during a single revolution of the disk. Thus, utilizing embodiments of the invention, the coalescing process 460 writes all of the unaligned writes to the disk in merely two revolutions 475.

In one embodiment, the unaligned writes are on the same track of the disk. Further, some of the groups of the plurality of the groups, such as group 1 463 and group 2 464, may be adjacent to one another whereas, other groups, may not be adjacent to one another. Also, in this example, the write operations for the flushing of the cache memory are performed on a single track of the disk. However, it should be appreciated that the write operations for the flushing of the cache memory may be performed for a plurality of tracks based upon implementation considerations.

It should be appreciated that when performing read operation 462 that the amount of data to be read includes data for multiple unaligned writes (e.g. for cache logic data segments #1 and #2 440 and 442). With the read data available for multiple unaligned writes, the multiple unaligned writes are then scheduled to be written (e.g. write process 470) to the disk at the same time (e.g. during a single revolution of the disk). In this way, performance is substantially improved by handling many nearby unaligned writes at the same time. Further, in other embodiments, it may be advantageous to delay scheduling of unaligned writes to allow more nearby unaligned writes to be received and to take advantage of them being coalesced. It should be appreciated that any number of any of unaligned writes may be coalesced and written simultaneously. Moreover, the writing operations for the coalesced unaligned writes may be performed for a single track or for a plurality of tracks. By utilizing this process, embodiments of the invention reduce the performance degradation suffered when handling unaligned writes by reducing the amount of RMW operations.

Thus, as previously described, once an unaligned write segment has been selected to be written to the disk, nearby unaligned write segments may be evaluated to determine whether they should be coalesced together with the previously selected write segment. It should be appreciated that different selection methods may be utilized such as coalescing unaligned write segments only on the same track or coalescing unaligned write segments on a pre-determined number of different tracks. Once two or more unaligned write segments have been selected to be coalesced, only a single read request is sent to the disk. The read request may span both unaligned write commands and may pick up missing data for unaligned writes. When two or more unaligned write segments have been selected to be coalesced, the missing data for both unaligned writes are available and both write segments may be submitted to be written to the disk at the same time in the one write request. It should be appreciated that, based on the previously described process, there is no limit on the number of unaligned write segments that may be coalesced.

Further, it should be appreciated that the amount of performance improvement yielded may be directly affected by the number of nearby unaligned write commands that are to be coalesced, which may be selectable as performance consideration. Also, the number of nearby unaligned write commands that are to be coalesced is workload specific and may depend upon the proximity of the unaligned write commands.

It should be appreciated that embodiments of the invention may be implemented in the control circuitry of a disk drive including but not limited to the processor, read/write channel, servo controller, memory etc., and may operate under the control of a program or routine to execute methods or processes in accordance with the previously described embodiments of the invention.

For purposes of the present specification, it should be appreciated that the terms "processor", "controller", etc., refer to any machine or collection of logic that is capable of executing a sequence of instructions and shall be taken to include, but not limited to, general purpose microprocessors, special purpose microprocessors, central processing units (CPUs), digital signal processors (DSPs), application specific integrated circuits (ASICs), multi-media controllers, signal processors, microcontrollers, etc.

Components of the various embodiments of the invention may be implemented as hardware, software, firmware, microcode, or any combination thereof. When implemented in software, firmware, or microcode, the elements of the embodiment of the invention are the program code or code segments that include instructions to perform the necessary tasks. A code segment may represent a procedure, a function, a sub-program, a program, a routine, a sub-routine, a module, a software package, or any combination of instructions, data structures, or program statements.

The program, instruction, or code segments may be stored in a processor readable medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

The methods and processes described previously can be employed by a disk drive. However, other types of data storage devices with similar or other media format characteristics can be employed by those skilled in the art to use the invention with equal advantage to implement these techniques.

What is claimed is:

1. A disk drive to implement write operations requested by a host, the disk drive comprising:
    a disk comprising a plurality of tracks, each track including a plurality of physical data sectors;
    a head actuated over the disk; and
    control circuitry operable to:
        determine if a write request from the host includes logic data that includes unaligned writes, wherein the logic data does not completely fill one of the physical data sectors, and if so:
        coalesce nearby writes;
        perform a group read operation to create a plurality of groups during a single revolution of the disk; and
        perform a write operation to write the logic data to the physical data sectors based upon the plurality of groups, wherein the physical data sectors are written to the disk during a single revolution of the disk.

2. The disk drive as recited in claim 1, wherein the unaligned writes are on the same track of the disk.

3. The disk drive as recited in claim 1, wherein groups of the plurality of groups are adjacent to one another.

4. The disk drive as recited in claim 1, wherein groups of the plurality of groups are not adjacent to one another.

5. The disk drive as recited in claim 1, further comprising a cache memory, wherein the write operations are based upon flushing the cache memory.

6. The disk drive as recited in claim 5, wherein if the cache memory stores all of the logic data of the data sector, the physical data sector is not read.

7. The disk drive as recited in claim 5, wherein write operations for the flushing of the cache memory is performed for a single track.

8. The disk drive as recited in claim 5, wherein write operations for the flushing of the cache memory is performed for a plurality of tracks.

9. The disk drive as recited in claim 5, wherein the write request is selected based upon rotational positional optimization.

10. A method to implement write operations requested by a host for a disk drive comprising:
    determining if a write request from the host includes logic data that includes unaligned writes, wherein the logic data does not completely fill one of a plurality of physical data sectors, and if so:
    coalescing nearby writes;
    performing a group read operation to create a plurality of groups during a single revolution of the disk; and performing a write operation to write the logic data to the physical data sectors based upon the plurality of groups, wherein the physical data sectors are written to the disk during a single revolution of the disk.

11. The method as recited in claim 10, wherein the unaligned writes are on the same track of the disk.

12. The method as recited in claim 10, wherein groups of the plurality of groups are adjacent to one another.

13. The method as recited in claim 10, wherein groups of the plurality of groups are not adjacent to one another.

14. The method as recited in claim 10, wherein the write operations are based upon flushing a cache memory.

15. The method as recited in claim 14, wherein if the cache memory stores all of the logic data of the data sector, the physical data sector is not read.

16. The method as recited in claim 14, wherein write operations for the flushing of the cache memory is performed for a single track.

17. The method as recited in claim 14, wherein write operations for the flushing of the cache memory is performed for a plurality of tracks.

18. The method as recited in claim 14, wherein the write request is selected based upon rotational positional optimization.

19. A disk drive to implement write operations requested by a host, the disk drive comprising:

a disk comprising a plurality of tracks, each track including a plurality of physical data sectors;

a head actuated over the disk; and control circuitry operable to:

determine if a write request from the host includes logic data that includes unaligned writes, wherein the logic data does not completely fill one of the physical data sectors, and if so:

coalesce nearby writes;

perform a group read operation to create a plurality of groups during a single revolution of the disk, wherein the plurality of groups correspond to physical data which correspond to the logic data in the write request; and perform a write operation to write the logic data to the physical data sectors based upon the plurality of groups, wherein the physical data sectors are written to the disk during a single revolution of the disk.

* * * * *